United States Patent [19]

Nishino

[11] 4,420,804

[45] Dec. 13, 1983

[54] SWITCHING REGULATOR WITH BASE CHARGE REMOVAL CIRCUIT

[75] Inventor: Hisao Nishino, Sendai, Japan

[73] Assignee: Tohoku Metal Industries, Ltd., Sendai, Japan

[21] Appl. No.: 296,113

[22] Filed: Aug. 25, 1981

[30] Foreign Application Priority Data

Aug. 26, 1980 [JP] Japan ................... 55-116412
Aug. 26, 1980 [JP] Japan ................... 55-116413

[51] Int. Cl.³ .................. H02P 13/22; H02P 13/30
[52] U.S. Cl. .................. 363/21; 323/288; 323/289
[58] Field of Search .............. 363/20, 21, 97, 131; 323/282, 284, 288, 289, 290

[56] References Cited

U.S. PATENT DOCUMENTS 4,005,317  1/1977  Hinrichs ................ 323/289
4,312,029  1/1982  Zellmer ................ 363/21

FOREIGN PATENT DOCUMENTS 1938954  6/1970  Fed. Rep. of Germany ...... 323/282
53-41719  4/1978  Japan ................... 363/21
599321  3/1978  U.S.S.R. ................ 363/21

Primary Examiner—William H. Beha, Jr.
Attorney, Agent, or Firm—Frishauf, Holtz, Goodman & Woodward

[57] ABSTRACT

A control circuit for a main switching transistor in a switching regulator, wherein PWM pulses are produced by varying a DC bias of triangular-wave pulses in response to a detected error signal, and which pulses are provided as a control signal for switching on and off the main switching transistor. In order to reduce power dissipation due to carrier storage at each turn-off operation of the switching transistor, a negative voltage potential is produced by a diode and a capacitor from square-wave pulses of a constant repetition frequency from which pulses the triangular-wave pulses are formed, and is applied to an emitter of an NPN transistor which operates as a variable impedance circuit for varying the DC bias of the triangular-wave pulses in response to the error signal, so that the triangular-wave pulses are biased to a negative voltage potential. Therefore, the base of the switching transistor rapidly drops down to a negative voltage potential at the time of each turn-off operation of the switching transistor, so that the stored carrier is rapidly drawn out of the base of the switching transistor.

10 Claims, 7 Drawing Figures

4,420,804

SWITCHING REGULATOR WITH BASE CHARGE REMOVAL CIRCUIT

BACKGROUND OF THE INVENTION

This invention relates to switching regulators, and in particular, to control of the switching transistor in switching regulators.

Voltage regulators of a switching type have been well known in the prior art and have been used in DC power supply devices for supplying regulated power to various electronic devices.

One or more switching transistors are used in switching regulators. It is well known that the switching transistor has suffered from power dissipation at the time of each turn-off operation. That is, when the switching transistor is turned off, current flow through the switching transistor is not stopped immediately but continues until the storage carriers are consumed. The current flow due to the storage carriers results in power dissipation.

SUMMARY OF THE INVENTION

It is an object of the present invention to provide a switching regulator wherein power dissipation is reduced at the time of each turn-off operation of the switching transistor.

It is another object of the invention to provide a control circuit for the switching transistor in switching regulators wherein the storage carrier of the switching transistor is rapidly drawn out from its base at the time of each turn-off operation.

It is still another object of the invention to provide a switching regulator with reduced power dissipation and with stable output performance.

It is yet another object of the invention to realize the objects described above with simple circuit arrangements.

According to the invention, a control circuit is provided for a first switching transistor in a switching regulator wherein the on-off operation of the switching transistor is controlled by an error signal detected in load voltage to regulate the load voltage constant. The control circuit comprises square-wave pulse generating means for generating AC square-wave pulses at a constant repetition frequency; triangular-wave forming means for forming triangular-wave pulses from the square-wave pulses; means including diode means and capacitance means which are connected in series between output terminals of said square-wave forming means for providing a voltage potential at a common connection point between the diode means and the capacitance means, the voltage potential being negative in relation to the output voltage of the triangular-wave forming means, and variable impedance means connected between the output of the triangular-wave forming means and said common connection point at the negative voltage potential, so that the triangular-wave pulses are biased to be negative at the voltage potential at each valley of the triangular-wave pulses, the detected error signal to be applied to said variable impedance means to vary its impedance in response to the error signal, and the triangular-wave pulses which are bias-controlled by the variable impedance means providing a control signal for controlling the turn-on and -off operation of the first switching transistor.

According to an aspect of this invention, a first transistor of an NPN type is used for the variable impedance means, and the output signal on the collector of the first transistor is applied to a base of the first switching transistor for switching on and off a DC power source to provide intermittent power to a pulse transformer, from the secondary winding of which pulse transformer AC power is obtained. The AC power is rectified to provide the regulated load voltage.

According to another aspect of this invention, the output signal on the collector of the first transistor is applied to a second switching transistor, and the output of the second switching transistor is used for controlling the first switching transistor to switch on and off a DC power source. The intermittent power is rectified to provide the regulated load voltage.

Further objects, features and other aspects of this invention will be understood from the following detailed description of preferred embodiments of the invention referring to the accompanying drawings.

DETAILED DESCRIPTION OF PREFERRED EMBODIMENTS

Figure 1:
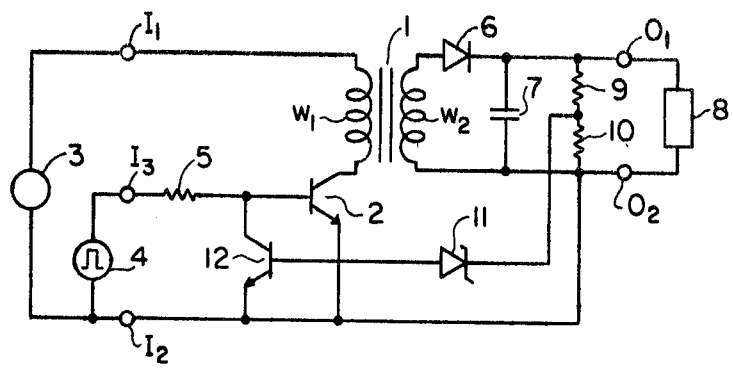
FIG. 1 is a view of a circuit diagram of a known switching regulator.

Referring to FIG. 1, a known switching voltage regulator shown therein includes a pulse transformer 1 having a primary winding $w_1$ and a secondary winding $w_2$. One end of primary winding $w_1$ is connected to the collector of a switching transistor 2, for example, an NPN switching transistor. The other end of primary winding $w_1$ and the emitter of switching transistor 2, respectively are connected to input terminals $I_1$ and $I_2$, to which a DC power source 3 is connected. A pulse generator 4 is coupled between the base and the emitter of switching transistor 2 through a base resistor 5. Pulse generator 4 provides square-wave pulses having a repetition frequency of, for example, 100 kHz, as shown by a line a in FIG. 2.

Since switching transistor 2 turns on at a time when its base voltage in relation to the emitter voltage exceeds a predetermined voltage, or a threshold voltage $V_T$, switching transistor 2 repeats on-off operations in response to the output pulses from pulse generator 4. As a result, the DC power applied to primary winding $w_1$ from DC power source 3 is switched on and off by switching transistor 2 with a repetition frequency of the pulses from pulse generator 4, so that square-wave current flows through primary winding $w_1$. Accordingly, a square-wave AC power is produced from secondary winding $w_2$.

A rectifying diode 6 and a smoothing capacitor 7 are connected to secondary winding $w_2$, and the opposite ends of smoothing capacitor 7 are connected to output terminals $O_1$ and $O_2$. Accordingly, the AC square-wave power on secondary winding $w_2$ is rectified and the rectified DC power is supplied to a load 8 connected to output terminals $O_1$ and $O_2$. In order to maintain the load voltage, or the voltage supplied to the load 8, constant, voltage dividing resistors 9 and 10 are connected between output terminals $O_1$ and $O_2$, and a divided voltage is compared with a reference zener voltage of a zener diode 11 to obtain an error signal. An NPN transistor, usually a switching transistor 12, is connected between the base and the emitter of switching transistor 2, and the error signal is applied to the base of transistor 12. That is, the base is connected to a common connection point between resistors 9 and 10 through a zener diode 11, while the emitter of transistor 12 is connected to output terminal $O_2$. Therefore, the voltage across resistor 10 is compared with the zener voltage of zener diode 11 and the error signal voltage is applied to the base and emitter of transistor 12 to control the impedance between the collector and emitter of transistor 12. When the output voltage elevates and when the divided voltage exceeds the zener voltage, the base voltage of transistor 12 rises so that the impedance between collector and emitter is lowered as shown by a line b in FIG. 2. Accordingly, the voltage between the base and the emitter of switching transistor 2 is lowered, and, therefore, does not rise to exceed the threshold voltage $V_T$ of switching transistor 2, as shown by a line c in FIG. 2, so that switching transistor 2 is maintained off as shown by line d in FIG. 2. Therefore, the load voltage drops down because no power is produced from secondary winding $w_2$ of transformer 1. Thereafter, when the voltage across resistor 10 is lowered below the zener voltage of zener diode 11, the impedance between the collector and the emitter of transistor 12 rises as shown by line b in FIG. 2, so that the voltage between the base and the emitter of switching transistor 2 exceeds the threshold voltage $V_T$ as shown by line c in FIG. 2. Therefore, switching transistor 2 is turned on. Thereafter, the on-off operation of switching transistor 2 is again carried out in response to the square-wave pulses from pulse generator 4, so that AC power again is produced from secondary winding $w_2$ of transformer 1.

The operation as described above is repeated so that the load voltage is maintained constant.

Figure 2:
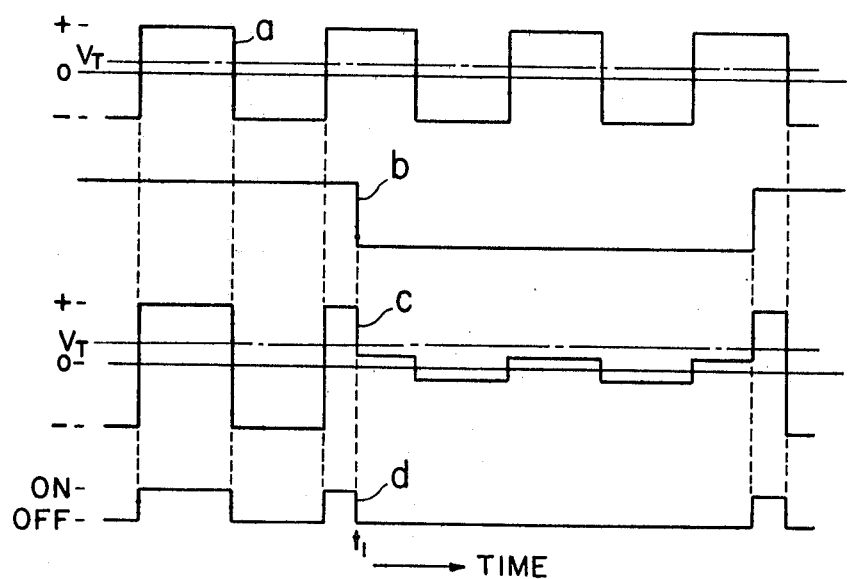
FIG. 2 is a view for illustrating voltage waveforms, impedance, and on-off operation of various points in the regulator of FIG. 1.

However, the known switching voltage regulator has suffered from power dissipation by switching transistor 2 because of its carrier storage effect. Referring to FIG. 2, when the impedance between collector and emitter of transistor 12 reduces rapidly at a time $t_1$ due to elevation of the load voltage, the base voltage of switching transistor 2 drops down below the threshold voltage $V_T$ to turn off switching transistor 2. But, because its base voltage does not drop down below its emitter voltage, the stored carrier is not rapidly removed from the base. Accordingly, a current flows through switching transistor 2 until the stored carrier is removed, even after the base voltage drops down below the threshold voltage $V_T$. Therefore, power dissipation is caused at the time when switching transistor 2 turns off.

This invention aims to remove such power dissipation.

Figure 3:
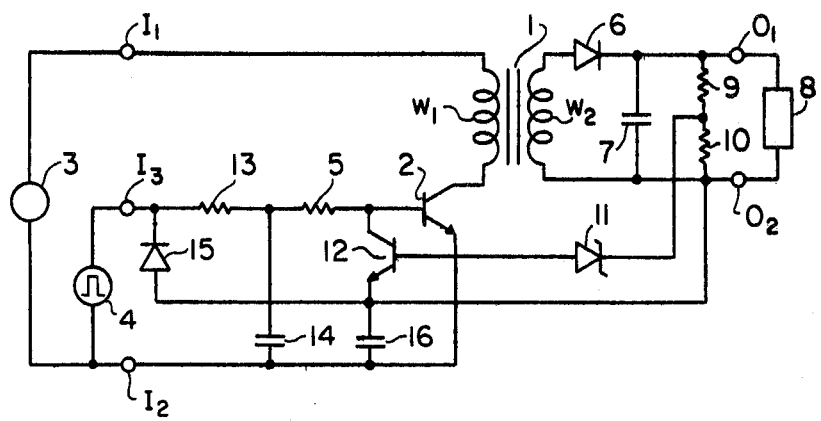
FIG. 3 is a view of a circuit diagram of an embodiment of the present invention.

Referring to FIG. 3, an embodiment shown therein is similar to the circuit of FIG. 1 except that a resistor 13 and a capacitor 14, a diode 15 and a capacitor 16 are used. That is, resistor 13 and capacitor 14 are connected between input terminals $I_3$ and $I_2$ to form an integrator circuit. Therefore, the input square-wave pulse as shown by a line a in FIG. 4 from pulse generator 4 is integrated to provide a triangular-wave pulse as shown by a line b in FIG. 4. The triangular-wave pulse is applied to the base of switching transistor 2 through a resistor 5. Switching transistor 2 is at an on-condition during a time when the base voltage exceeds the threshold voltage $V_T$ due to application of the triangular-wave pulse. Accordingly, switching transistor 2 carries out its turn-on and -off operation in response to square-wave pulses from pulse generator 4. Therefore, the DC output power is obtained from output terminals $O_1$ and $O_2$, in a manner similar to the operation of the circuit of FIG. 1.

The emitter of transistor 12 is connected to input terminal $I_2$ not directly but through capacitor 16, and is connected to input terminal $I_3$ through diode 15, so that the square-wave pulses from pulse generator 4 are rectified to maintain the emitter voltage of transistor 12 negative in relation to the voltage of the input terminal $I_2$. That is, the emitter voltage is given by $-V_c$ which is the voltage difference across capacitor 16 as shown by a line c in FIG. 4. Therefore, the emitter voltage of transistor 12 is lower than the emitter of switching transistor 2 by $V_c$. Therefore, the collector voltage potential drops down to a negative potential at each valley of the triangular-wave pulses of b in FIG. 4. This is illustrated by a line e in FIG. 4. This means that the base voltage of switching transistor 2 drops down to a negative potential immediately after the base voltage drops down less than the threshold voltage $V_T$ of the switching transistor 2. Accordingly, the storage carrier of switching transistor 2 is rapidly drawn out at the time of each turn-off operation of switching transistor 2. As a result, power dissipation due to the storage carrier is greatly reduced at each turn-off operation of switching transistor 2.

The voltage difference across resistor 10 is applied to the base and the emitter of transistor 12 through zener diode 11 similar to the circuit of FIG. 1. Therefore, the impedance between the collector and the emitter of transistor 12 changes with variation of the DC output power in voltage, as shown by a line d in FIG. 4, according to the manner similar to the circuit of FIG. 1. Referring to lines e and f in FIG. 4, after the impedance is lowered at a time $t_1$ as shown by line d in FIG. 4, the base voltage of switching transistor 2 does not exceed the threshold voltage $V_T$ so that switching transistor 2 is maintained off. Thereafter, the base voltage of switching transistor 2 exceeds the threshold voltage $V_T$ in response to the triangular-wave pulse after the impedance between the collector and the emitter of transistor 12 is increased at a time $t_2$. After the impedance again lowers at a time $t_3$, the base voltage of switching transistor 2 does not exceed the threshold voltage $V_T$ so that switching transistor 2 is maintained off. The operation as described above is repeated and the load voltage is maintained constant.

Figure 4:
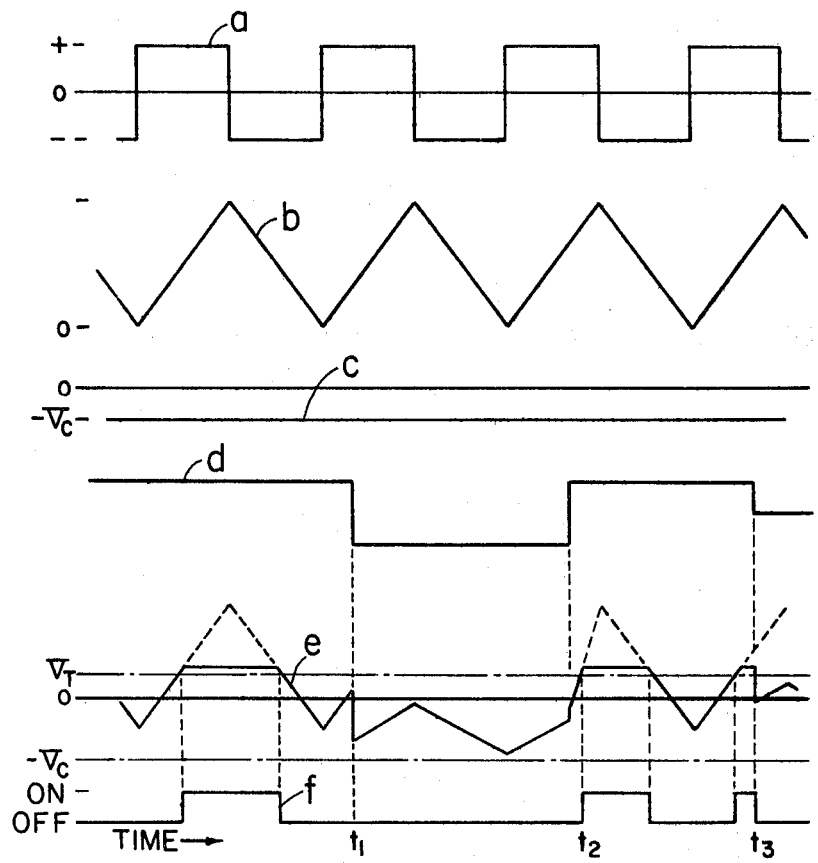
FIG. 4 is a view for illustrating voltage waveforms, impedance, and on-off operation of various points in the regulator of FIG. 3.

During the operation, when the impedance between the collector and the emitter of transistor 12 lowers rapidly within an onduration of switching transistor 2, the base voltage of switching transistor 2 rapidly drops down to the negative voltage $-V_c$, as clearly shown at a time $t_3$ on line e in FIG. 4. Therefore, the storage carrier is rapidly drawn out of the base of switching transistor 2 so that no current flows through the collector and the emitter of switching transistor 2 at a time when the base voltage lowers below the threshold voltage $V_T$. Accordingly, power is almost not dissipated at the turn-off operation of switching transistor 2.

A switching transistor must not be used for transistor 12, but a transistor for an A-class amplifier may be used.

Figure 5:
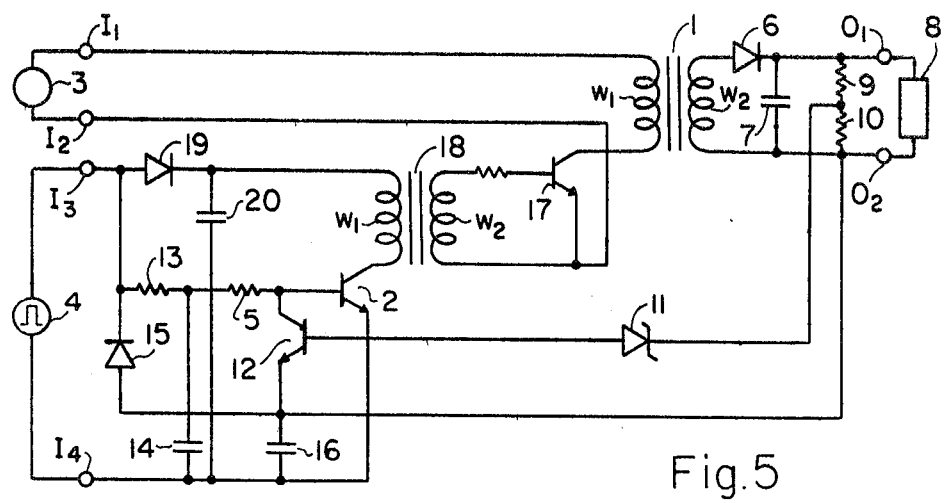
FIG. 5 is a view of a circuit diagram of another embodiment.

Referring to FIG. 5, another embodiment shown therein is similar to the voltage regulator of FIG. 3 except that the main switching transistor 17 is not directly driven by the output of transistor 12 but is driven through another switching transistor 2 and a pulse transformer 18. However, in a view point of circuit arrangement switching transistor 2 in this embodiment correspond to switching transistor 2 of FIG. 3, pulse transformer 18 corresponds to transformer 1 of FIG. 3, and a DC voltage is supplied to a primary winding $w_1$ of pulse transformer 18 by rectifying square-wave pulses from pulse generator 4 by a diode 19 and a capacitor 20. Therefore, square-wave pulses are present on the secondary winding $w_2$ of pulse transformer 18 in a similar manner as described above in connection with FIG. 3. Accordingly, main switching transistor 17 is switched on and off by the square-wave pulses on secondary winding $w_2$ of pulse transformer 18, so that the DC power applied to primary winding $w_1$ of pulse transformer 1 from DC power source 3 is switched on and off. Therefore, AC square-wave pulses are present on secondary winding $w_2$ of pulse transformer 1. The AC square-wave pulses are rectified by diode 6 and smoothed by capacitor 7 and applied to load 8.

When the voltage of the output DC power rises, the impedance between collector and emitter of transistor 12 lowers in same manner as described above in connection with FIGS. 3 and 4. Therefore, the on-off operation of switching transistor 2 is carried out as shown by line f in FIG. 4, similar to switching transistor 2 in FIG. 3. Accordingly, main switching transistor 17 is controlled by the output of switching transistor 2 through pulse transformer 18 and carries out the on-off operation similar to that as shown by line f in FIG. 4. Therefore, the load voltage is also maintained constant.

In this embodiment, the stored carrier of switching transistor 2 is rapidly drawn out from its base at each turn-off operation. Furthermore, the stored carrier of main switching transistor 17 is also drawn out by the flyback energy of pulse transformer 18.

Therefore, power dissipation is almost entirely reduced at any of the switching transistors.

Figure 6:
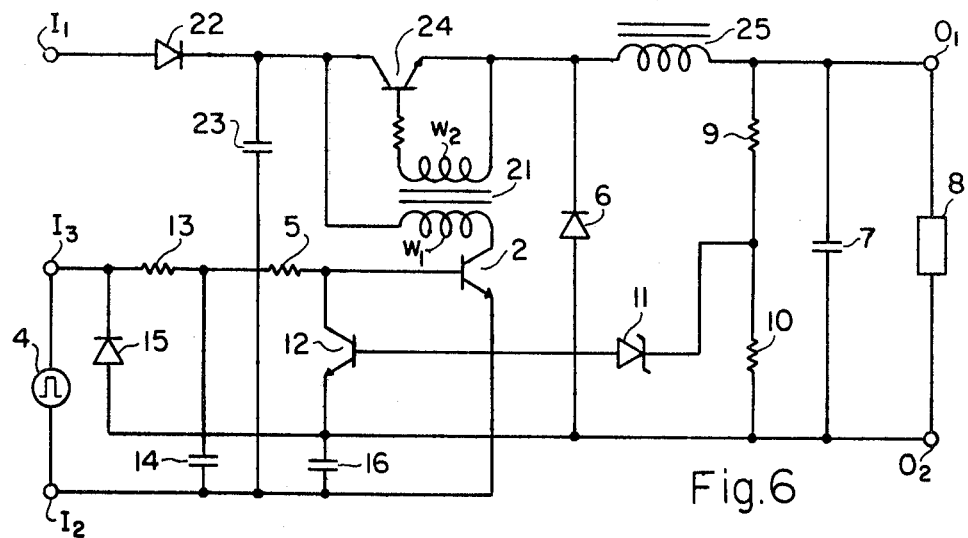
FIG. 6 is a view of a circuit diagram of still another embodiment.

Referring to FIG. 6, another embodiment shown therein is a type in which a main switching transistor 24 is connected in series between a DC power source and load 8. In the arrangement shown, a switching transistor 2 corresponding to switching transistor 2 of FIG. 5 is connected to a DC power source in series with a primary winding $w_1$ of a pulse transformer 21. In this embodiment, an AC power source is connected to input terminals $I_1$ and $I_2$ but a diode 22 and a capacitor 23 are used for rectifying the AC power to provide the DC power. The base and the emitter of main switching transistor 24 are connected to the secondary winding $w_2$ of pulse transformer 21 so that main switching transistor 24 is driven by the secondary output of transformer 21.

A drive circuit for switching transistor 2 which is composed of pulse generator 4, resistor 13, capacitor 14, resistor 5, transistor 12, capacitor 16, voltage dividing resistors 9 and 10, and zener diode 11 is arranged similar to that in the regulator of FIG. 3. Therefore, switching transistor 2 operates similar to that of FIG. 3, for example, as shown by line f in FIG. 4. Accordingly, main switching transistors 24 is also switched on and off by outputs of switching transistor 2 through pulse transformer 21. DC power is intermittently passed through the main switching transistor 24 and the intermittent power is rectified by parallel diode 6, a series choke coil 25, and parallel capacitor 7 to provide DC power to load 8 with a regulated voltage.

Figure 7:
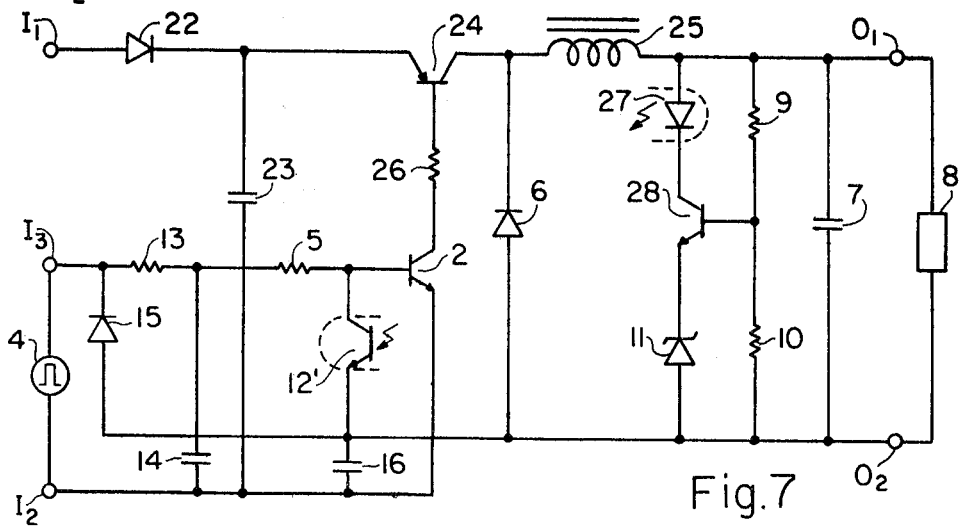
FIG. 7 is a view of a circuit diagram of a further embodiment.

Referring to FIG. 7, another embodiment shown therein is a modification of the embodiment of FIG. 6. That is, the output of switching transistor 2 is coupled with the base of main switching transistor 24 through a resistor 26 rather than a pulse transformer, and a photo transistor 12' is used in place of transistor 12 in FIG. 6. The error signal is fed to photo transistor 12' from a photo diode 27 photo-coupled therewith.

Photo diode 27 is connected in a collector circuit of a transistor 28, and zener diode 11 is connected in the emitter circuit of transistor 28. The base of transistor 28 is connected to a common connection point of voltage dividing resistors 9 and 10. Therefore, when the divided voltage, or the voltage across resistor 10, exceeds the zener voltage of zener diode 11, transistor 28 turns on to permit photo diode 27 to illuminate. Thus, the error signal is fed to photo transistor 12', so that the impedance between the collector and the emitter of photo transistor 12' is reduced. Therefore, the regulator operates similar to regulator of FIG. 6.

As variable impedance means varying in response to a detected error signal, an NPN transistor has been used in the embodiments. However, it will be easily understood that other various variable impedance means, for example, an operation amplifier or the like can be used.

What is claimed is:

1. In a switching regulator wherein the on-off operation of a first switching transistor is controlled in response to an error signal detected in DC load voltage to regulate the load voltage at a constant level, the improvement comprising a circuit for controlling said first switching transistor, which comprises:
   square-wave pulse generating means for generating AC square-wave pulses at a constant repetition frequency;
   triangular-wave forming means for forming triangular-wave pulses from said square-wave pulses;
   means including diode means and capacitance means connected in series with one another between output terminals of said square-wave pulse generating means, for providing a voltage potential at a common connection point between said diode means and said capacitance means, said voltage potential being negative in relation to the output voltage of said triangular-wave forming means; and
   variable impedance means connected between the output of said triangular-wave forming means and said common connection point at the negative voltage potential so that the triangular-wave pulses are biased to be negative in voltage potential at each valley of the triangular-wave pulses, said variable impedance means being operative to vary its impedance in response to the error signal, the biased triangular-wave pulses produced by said variable impedance means providing a control signal coupled to said first switching transistor for controlling turn-on and off operation of said first switching transistor.

2. The switching regulator as claimed in claim 1, wherein said variable impedance means comprises first transistor means of an NPN type having a collector and an emitter which are connected to the output of said triangular-wave forming means and said common connection point at the negative voltage potential, respectively, the error signal in the load voltage being applied to the base of said first transistor means.

3. The switching regulator as claimed in claim 2, wherein said first switching transistor is of an NPN type, and the collector of said first transistor means is directly connected to the base of said first switching transistor.

4. The switching regulator as claimed in claim 3, which further comprises a pulse transformer having a primary winding and a secondary winding, said first switching transistor arranged to be connected to a DC power source in series with said primary winding of said pulse transformer, second rectifying means connected to said secondary winding of said pulse transformer and for rectifying the secondary output of said pulse transformer to provide the regulated load voltage.

5. The switching regulator as claimed in claim 2, which further comprises voltage divider means connected to the DC load voltage output to divide the DC load voltage, a zener diode for providing a reference voltage, a photo diode, means coupled to said voltage divider means and said zener diode for comparing the divided voltage from said voltage divider means with said reference voltage and accordingly to permit said photo diode to illuminate, said first transistor means being a photo transistor which is photo-coupled with said photo diode.

6. The switching regulator as claimed in claim 5, wherein said comparing means is a second transistor, said zener diode is connected to the emitter of said second transistor, said divided voltage is coupled with the base of said second transistor, and said photo diode is connected to the collector of said second transistor.

7. The switching regulator as claimed in claim 1, which further comprises a first pulse transformer having a primary winding and a secondary winding, a second switching transistor of NPN type arranged to be connected to a DC power source in series with said primary winding of said first pulse transformer, said control signal being applied to the base of said second switching transistor, said first switching transistor connected to said secondary winding of said first pulse transformer arranged to be controlled by the secondary output of said first pulse transformer.

8. The switching regulator as claimed in claim 7, wherein said DC power source comprises rectifying means for rectifying said square-wave pulses from said square-wave pulse generating means.

9. The switching regulator as claimed in claim 7, which further comprises a second pulse transformer having a primary winding and a secondary winding, said first switching transistor arranged to be connected to a DC power source in series with the primary winding of said second pulse transformer, and second rectifying means connected to the secondary winding of said second pulse transformer for rectifying the output of said second pulse transformer to provide the regulated load voltage.

10. The switching regulator as claimed in claim 1, which further comprises voltage divider means connected to the DC load voltage output to divide the DC load voltage, and a zener diode connected to said voltage divider means for comparing the divided voltage with its zener voltage to provide the error signal.

* * * * *